United States Patent
Kim et al.

(10) Patent No.: US 10,007,343 B2
(45) Date of Patent: Jun. 26, 2018

(54) FORCE SENSOR IN AN INPUT DEVICE

(71) Applicant: Apple Inc., Cupertino, CA (US)

(72) Inventors: Sora Kim, Cupertino, CA (US); Martin P. Grunthaner, Cupertino, CA (US); Rui Jin, Cupertino, CA (US); Michael B. Wittenberg, Cupertino, CA (US); MIchael K. McCord, Cupertino, CA (US); Henric Larsson, Cupertino, CA (US); Giovanni Gozzini, Cupertino, CA (US); Lucy Browning, Cupertino, CA (US); Scott A. Myers, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/087,306

(22) Filed: Mar. 31, 2016

(65) Prior Publication Data

US 2017/0285746 A1 Oct. 5, 2017

(51) Int. Cl.
| | |
|---|---|
| *G06F 3/01* | (2006.01) |
| *G06F 3/044* | (2006.01) |
| *G06K 9/00* | (2006.01) |
| *G06F 3/041* | (2006.01) |
| *H03K 17/975* | (2006.01) |

(Continued)

(52) U.S. Cl.
CPC .............. *G06F 3/016* (2013.01); *G06F 3/041* (2013.01); *G06F 3/044* (2013.01); *G06K 9/00006* (2013.01); *G06K 9/00013* (2013.01); *H03K 17/975* (2013.01); *G06F 21/32* (2013.01); *G06F 2203/04105* (2013.01); *H03K 17/964* (2013.01); *H03K 17/9625* (2013.01); *H03K 2217/960755* (2013.01)

(58) Field of Classification Search
CPC . G06F 2203/04103; G06F 2203/04105; G06F 3/0412
See application file for complete search history.

(56) References Cited

U.S. PATENT DOCUMENTS

| | | |
|---|---|---|
| 4,527,862 A | 7/1985 | Arakawa |
| 5,343,064 A | 8/1994 | Spangler et al. |

(Continued)

FOREIGN PATENT DOCUMENTS

| | | |
|---|---|---|
| CN | 1502166 | 6/2004 |
| CN | 1577385 | 2/2005 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Benjamin C Lee
*Assistant Examiner* — Chun-Nan Lin
(74) *Attorney, Agent, or Firm* — Brownstein Hyatt Farber Schreck, LLP

(57) ABSTRACT

An input device can be integrated within an electronic device and/or operably connected to an electronic device through a wired or wireless connection. The input device can include one or more force sensors positioned below a cover element of the input device or an input surface of the electronic device. The input device can include other components and/or functionality, such as a biometric sensor and/or a switch element.

19 Claims, 8 Drawing Sheets

(51) Int. Cl.
*G06F 21/32* (2013.01)
*H03K 17/96* (2006.01)

(56) References Cited

U.S. PATENT DOCUMENTS

| | | | |
|---|---|---|---|
| 5,929,517 A * | 7/1999 | Distefano | H01L 21/565 174/525 |
| 6,002,389 A | 12/1999 | Kasser | |
| 6,079,282 A | 6/2000 | Lanter | |
| 6,154,580 A | 11/2000 | Kuriyama et al. | |
| 6,323,846 B1 | 11/2001 | Westerman et al. | |
| 6,545,495 B2 | 4/2003 | Warmack et al. | |
| 6,568,275 B2 | 5/2003 | Scholz et al. | |
| 6,570,557 B1 | 5/2003 | Westerman et al. | |
| 6,570,707 B1 | 5/2003 | Murakami | |
| 6,676,611 B1 | 1/2004 | Bromba | |
| 6,677,932 B1 | 1/2004 | Westerman | |
| 6,989,728 B2 | 1/2006 | Van Zeeland et al. | |
| 7,158,122 B2 | 1/2007 | Roberts | |
| 7,211,885 B2 | 5/2007 | Nordal et al. | |
| 7,337,085 B2 | 2/2008 | Soss | |
| 7,511,702 B2 | 3/2009 | Hotelling | |
| 7,538,760 B2 | 5/2009 | Hotelling et al. | |
| 7,609,178 B2 | 10/2009 | Son et al. | |
| 7,719,522 B2 | 5/2010 | Lyon et al. | |
| 7,784,366 B2 | 8/2010 | Daverman et al. | |
| 7,800,592 B2 | 9/2010 | Kerr et al. | |
| 7,920,134 B2 | 4/2011 | Krah | |
| 8,072,437 B2 | 12/2011 | Miller et al. | |
| 8,111,248 B2 | 2/2012 | Lee et al. | |
| 8,169,332 B2 | 5/2012 | Bernstein et al. | |
| 8,169,416 B2 | 5/2012 | Han | |
| 8,228,306 B2 | 7/2012 | Long | |
| 8,253,711 B2 | 8/2012 | Kim et al. | |
| 8,274,495 B2 | 9/2012 | Lee | |
| 8,334,849 B2 | 12/2012 | Murphy et al. | |
| 8,351,993 B2 | 1/2013 | Nunes | |
| 8,390,481 B2 | 3/2013 | Pance et al. | |
| 8,421,978 B2 | 4/2013 | Wang et al. | |
| 8,436,823 B2 | 5/2013 | Kanehira et al. | |
| 8,547,350 B2 | 10/2013 | Anglin et al. | |
| 8,577,289 B2 | 11/2013 | Schlub et al. | |
| 8,577,644 B1 | 11/2013 | Ksondzyk et al. | |
| 8,633,916 B2 | 1/2014 | Bernstein et al. | |
| 8,638,316 B2 | 1/2014 | Badaye et al. | |
| 8,669,963 B2 | 3/2014 | Baker et al. | |
| 8,711,122 B2 | 4/2014 | Wada et al. | |
| 8,724,861 B1 | 5/2014 | Sun | |
| 8,743,083 B2 | 6/2014 | Zanone et al. | |
| 8,760,413 B2 | 6/2014 | Peterson et al. | |
| 8,780,055 B2 | 7/2014 | Marchand et al. | |
| 8,780,075 B2 | 7/2014 | Yamano et al. | |
| 8,830,205 B2 | 9/2014 | Chang et al. | |
| 8,913,031 B2 | 12/2014 | Honda et al. | |
| 8,922,523 B2 | 12/2014 | Lynch et al. | |
| 8,963,874 B2 | 2/2015 | Li et al. | |
| 9,001,080 B2 | 4/2015 | Okayama et al. | |
| 9,024,907 B2 | 5/2015 | Bolender | |
| 9,030,440 B2 | 5/2015 | Pope et al. | |
| 9,057,653 B2 | 6/2015 | Schediwy et al. | |
| 9,086,768 B2 | 7/2015 | Elias et al. | |
| 9,088,282 B2 | 7/2015 | Holenarsipur et al. | |
| 9,092,129 B2 | 7/2015 | Abdo et al. | |
| 9,104,898 B2 | 8/2015 | Case | |
| 9,116,569 B2 | 8/2015 | Stacy et al. | |
| 9,229,587 B2 | 1/2016 | Kawaguchi et al. | |
| 9,262,002 B2 | 2/2016 | Momeyer et al. | |
| 9,354,752 B2 | 5/2016 | Kanehira et al. | |
| 9,375,874 B2 | 6/2016 | Lin et al. | |
| 9,390,308 B2 | 7/2016 | Mankowski et al. | |
| 9,411,458 B2 | 8/2016 | Worfolk et al. | |
| 9,430,102 B2 | 8/2016 | Prest et al. | |
| 9,454,268 B2 | 9/2016 | Badaye et al. | |
| 9,477,342 B2 | 10/2016 | Daverman et al. | |
| 9,494,473 B2 | 11/2016 | Hanson et al. | |
| 9,541,578 B2 | 1/2017 | Shimata et al. | |
| 9,671,889 B1 | 6/2017 | Miller et al. | |
| 9,678,586 B2 | 6/2017 | Reynolds | |
| 9,710,095 B2 | 7/2017 | Hotelling | |
| 9,715,301 B2 | 7/2017 | Kuboyama et al. | |
| 9,851,828 B2 | 12/2017 | Richards et al. | |
| 2006/0197753 A1 | 9/2006 | Hotelling | |
| 2006/0273417 A1 * | 12/2006 | Ganapathi | G01L 1/142 257/415 |
| 2007/0272919 A1 | 11/2007 | Mori et al. | |
| 2008/0150901 A1 | 6/2008 | Lowles et al. | |
| 2009/0015564 A1 | 1/2009 | Ye et al. | |
| 2009/0066345 A1 | 3/2009 | Klauk et al. | |
| 2009/0237374 A1 | 9/2009 | Li et al. | |
| 2010/0045628 A1 | 2/2010 | Gettemy et al. | |
| 2010/0117989 A1 | 5/2010 | Chang | |
| 2010/0123686 A1 * | 5/2010 | Klinghult | G06F 3/0412 345/178 |
| 2010/0220065 A1 | 9/2010 | Ma | |
| 2011/0012845 A1 | 1/2011 | Rothkopf et al. | |
| 2011/0037706 A1 | 2/2011 | Pasquero et al. | |
| 2011/0080373 A1 | 4/2011 | Wang et al. | |
| 2011/0096013 A1 | 4/2011 | Krumpelman et al. | |
| 2011/0216016 A1 | 9/2011 | Rosener | |
| 2011/0227872 A1 | 9/2011 | Huska et al. | |
| 2011/0235156 A1 | 9/2011 | Kothari et al. | |
| 2012/0038577 A1 | 2/2012 | Brown et al. | |
| 2012/0056826 A1 | 3/2012 | Kim et al. | |
| 2012/0086669 A1 | 4/2012 | Kim et al. | |
| 2012/0089348 A1 | 4/2012 | Perlin et al. | |
| 2012/0090757 A1 | 4/2012 | Buchan et al. | |
| 2012/0098760 A1 | 4/2012 | Chuang | |
| 2012/0098767 A1 | 4/2012 | Takai et al. | |
| 2012/0104097 A1 * | 5/2012 | Moran | G06K 7/0004 235/449 |
| 2012/0169612 A1 | 7/2012 | Alameh et al. | |
| 2012/0188202 A1 | 7/2012 | Tsujino et al. | |
| 2012/0274602 A1 | 11/2012 | Bita et al. | |
| 2012/0313863 A1 | 12/2012 | Hsu | |
| 2012/0319987 A1 | 12/2012 | Woo | |
| 2013/0076375 A1 | 3/2013 | Hanumanthaiah et al. | |
| 2013/0113732 A1 | 5/2013 | Kang et al. | |
| 2013/0128416 A1 | 5/2013 | Weber | |
| 2013/0176270 A1 | 7/2013 | Cattivelli et al. | |
| 2013/0234977 A1 | 9/2013 | Lin | |
| 2013/0328575 A1 | 12/2013 | Ra et al. | |
| 2014/0085213 A1 | 3/2014 | Huppi et al. | |
| 2014/0085247 A1 | 3/2014 | Leung et al. | |
| 2014/0111953 A1 | 4/2014 | McClure et al. | |
| 2015/0071509 A1 | 3/2015 | Myers | |
| 2015/0107374 A1 * | 4/2015 | Ting | B06B 1/0622 73/862.043 |
| 2015/0135108 A1 | 5/2015 | Pope et al. | |
| 2015/0153829 A1 | 6/2015 | Shiraishi | |
| 2015/0185909 A1 | 7/2015 | Gecnuk | |
| 2015/0185946 A1 | 7/2015 | Fourie | |
| 2015/0370376 A1 | 12/2015 | Harley et al. | |
| 2015/0370396 A1 | 12/2015 | Ogata et al. | |
| 2016/0033342 A1 | 2/2016 | Lyon et al. | |
| 2016/0034088 A1 | 2/2016 | Richards et al. | |
| 2016/0041648 A1 | 2/2016 | Richards | |
| 2016/0042166 A1 | 2/2016 | Kang et al. | |
| 2016/0062498 A1 | 3/2016 | Huppi et al. | |
| 2016/0070404 A1 | 3/2016 | Kerr et al. | |
| 2016/0098131 A1 | 4/2016 | Ogata et al. | |
| 2016/0103542 A1 | 4/2016 | Ogata et al. | |
| 2016/0103544 A1 | 4/2016 | Filiz et al. | |
| 2016/0139716 A1 | 5/2016 | Filiz et al. | |
| 2016/0258981 A1 | 9/2016 | Bushnell et al. | |
| 2016/0314334 A1 * | 10/2016 | He | G06K 9/0012 |
| 2016/0378255 A1 | 12/2016 | Butler et al. | |
| 2017/0038877 A1 | 2/2017 | Kuboyama et al. | |
| 2017/0046008 A1 | 2/2017 | Chen et al. | |

(56) References Cited

U.S. PATENT DOCUMENTS

2017/0235403 A1 8/2017 Miller et al.
2017/0322660 A1 11/2017 Kuboyama et al.

FOREIGN PATENT DOCUMENTS

| | | |
|---|---|---|
| CN | 1582453 | 2/2005 |
| CN | 1707415 | 12/2005 |
| CN | 1714336 | 12/2005 |
| CN | 101046720 | 10/2007 |
| CN | 101427468 | 5/2009 |
| CN | 101950224 | 1/2011 |
| CN | 102016780 | 4/2011 |
| CN | 201828892 | 5/2011 |
| CN | 102103445 | 6/2011 |
| CN | 102138120 | 7/2011 |
| CN | 102193699 | 9/2011 |
| CN | 102449583 | 5/2012 |
| CN | 102467308 | 5/2012 |
| CN | 102483673 | 5/2012 |
| CN | 204650590 | 9/2015 |
| EP | 2073107 | 6/2009 |
| EP | 2128747 | 12/2009 |
| EP | 2237142 | 10/2010 |
| EP | 2267791 | 12/2010 |
| EP | 2315102 | 4/2011 |
| EP | 2315186 | 4/2011 |
| EP | 2357547 | 8/2011 |
| EP | 2413224 | 2/2012 |
| EP | 2418561 | 2/2012 |
| EP | 2420918 | 2/2012 |
| EP | 2508960 | 10/2012 |
| EP | 2660688 | 11/2013 |
| EP | 2708985 | 3/2014 |
| GB | 2313195 | 11/1997 |
| JP | 2005031425 | 2/2005 |
| JP | 2007310539 | 11/2007 |
| JP | 2010244252 | 10/2010 |
| JP | 2011100364 | 5/2011 |
| JP | 2014052997 | 3/2014 |
| KR | 1020100074005 | 7/2010 |
| WO | WO 97/018528 | 5/1997 |
| WO | WO 11/156447 | 12/2011 |
| WO | WO 12/031564 | 3/2012 |
| WO | WO 12/147659 | 11/2012 |
| WO | WO 12/160844 | 11/2012 |
| WO | WO 13/083207 | 6/2013 |
| WO | WO 13/183191 | 12/2013 |
| WO | WO 14/018121 | 1/2014 |
| WO | WO 12/153555 | 7/2014 |
| WO | WO 14/124173 | 8/2014 |

OTHER PUBLICATIONS

Engineers Edge, Common Plastic Molding Design Material Specification, 2015, http://www.engineersedge.com/plastic/materials_common_plastic.htm, 3 pages.

Feist, "Samsung snags patent for new pressure sensitive touchscreens," posted on AndroidAuthority.com at URL: http://www.androidauthority.com/samsung-patent-pressure-sensitive-touch-screens-354860, Mar. 7, 2014, 1 page.

Widdle, "Measurement of the Poisson's ratio of flexible polyurethane foam and its influence on a uniaxial compression model," International Journal of Engineering Science, vol. 46, 2008, pp. 31-49.

International Search Report and Written Opinion dated Jun. 23, 2017, PCT/US2017/024325, 14 pages.

* cited by examiner

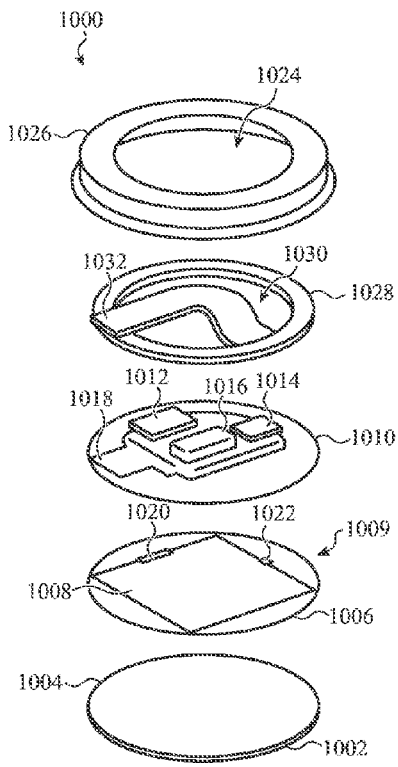
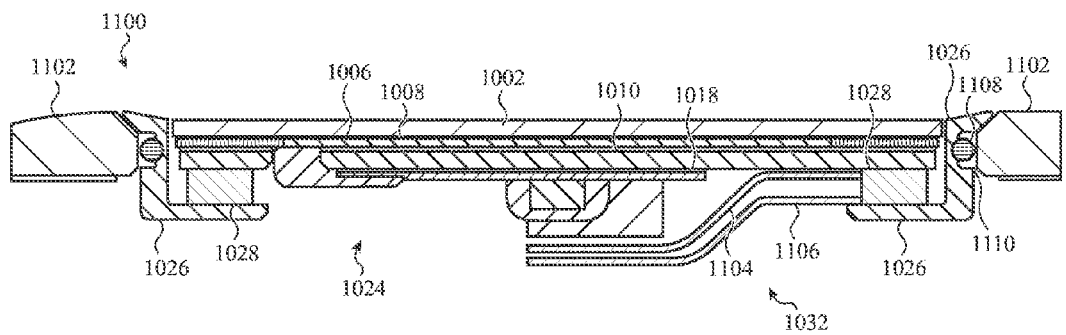

FORCE SENSOR IN AN INPUT DEVICE

FIELD

The described embodiments relate generally to force sensing. More particularly, the present embodiments relate to a force sensor in an input device.

BACKGROUND

Many electronic devices include one or more input devices for receiving user inputs. Devices such as smart telephones, tablet computing devices, laptop computers, wearable communication and health devices, and navigation devices, and displays can include, or be connected to, an input device. For example, an input device can provide information to a computing system regarding user interaction with a graphical user interface (GUI), such as selecting elements, returning to a home page, and other GUI features. In another example, an input device can capture or receive biometric data associated with a user and provide such biometric data to a computing system.

Generally, operation of an input device is binary. A key of a keyboard, for example, is either pressed sufficiently to collapse a dome switch and generate an output signal, or it is not. An input button is either pressed sufficiently to close a switch and select an icon, or it is not.

Binary inputs are inherently limited insofar as they can only occupy two states (present or absent, on or off, and so on). In some situations, it may be advantageous to also detect and measure the force of an input that is applied to an input device. In addition, when force is measured across a continuum of values, the detected force can function as a non-binary input.

SUMMARY

An input device can be included in an electronic device or operably connected to the electronic device using a wired or wireless connection. One or more force sensors in the input device is configured to detect a force input that is applied to a cover element. The cover element can be a portion of the housing of the electronic device or an input surface of the input device disposed in an aperture of the housing.

The force sensor can employ any suitable force sensing technology, such as capacitive, piezoelectric, piezoresistive, ultrasonic, and magnetic force sensing technologies. In one embodiment, the force sensor is a capacitive force sensor. The force sensor is formed with a first circuit layer that includes a first set of one or more electrodes and a second circuit layer that includes a second set of one or more electrodes. The second set of one or more electrodes is spaced apart from the first set of one or more electrodes by a compliant material (e.g., air, a silicone layer). Each electrode in the first set is aligned in at least one direction (e.g., vertically) with a respective electrode in the second set to produce one or more capacitors. When a force is applied to the cover element, the cover element bends or deflects which causes at least one electrode in the first set to move closer to a respective electrode in the second set. The capacitance of the capacitor formed by the two electrodes varies as the distance between the electrodes decreases. A force signal sensed from each capacitor represents a capacitance measurement of that capacitor. A processing device is configured to receive the force signal(s) and correlate the force signal(s) to an amount of force applied to the cover element.

In one aspect, the input device includes a fingerprint sensor positioned below the cover element. The fingerprint sensor is configured to capture a fingerprint of a finger as the finger approaches or contacts the cover element. A force sensor is positioned below the fingerprint sensor and over a support element. The force sensor is configured to detect a force input applied to the cover element.

In another aspect, an input device includes a cover element, one or more first force sensors positioned around a peripheral edge of the cover element, and a second force sensor positioned below the cover element. Each first force sensor is configured to detect a first force input applied to the cover element. The second force sensor is configured to detect a second force input applied to the cover element. The one or more first and the second force sensors can operate to detect force inputs in parallel, in series, or with a time offset. For example, one force sensor can be used initially to detect an amount of applied force. As the amount of applied force increases, that force sensor reaches a maximum detectable force. At this point, the other force sensor may be used to detect the applied force. Alternatively, in some embodiments, both the first and second force sensors can be used to detect a force input up to a given amount of force, and then one of the force sensors may be used to detect force inputs greater than the given amount of force.

In another aspect, an input device for use with an electronic device can include a cover element, a fingerprint sensor positioned below the cover element, and a force sensor positioned below the fingerprint sensor and over a support element. The fingerprint sensor may be configured to capture a fingerprint of a finger as the finger approaches or contacts the cover element. The force sensor can be configured to detect a force input applied to the cover element. The input device may also include a compliant layer positioned below the cover element and around at least a portion of the fingerprint sensor.

In some embodiments, the input device can include additional components that receive one or more inputs from a user in addition to a force input. For example, in one embodiment the input device includes a biometric sensor. Additionally or alternatively, the input device may include a switch element that detects a user input when a force input applied to the cover element exceeds a given amount of force. The switch element can generate or transmit a signal based on the detected user input, and a processing device can register the user input based on the signal received from the switch element.

BRIEF DESCRIPTION OF THE DRAWINGS

The disclosure will be readily understood by the following detailed description in conjunction with the accompanying drawings, wherein like reference numerals designate like structural elements, and in which:

FIG. 10 shows an exploded view of a third input device that is suitable for use in the electronic device shown in FIG. 1;

FIG. 11 shows a cross-sectional view of the third input device shown in FIG. 10 when the input device is assembled.

Figure 1:
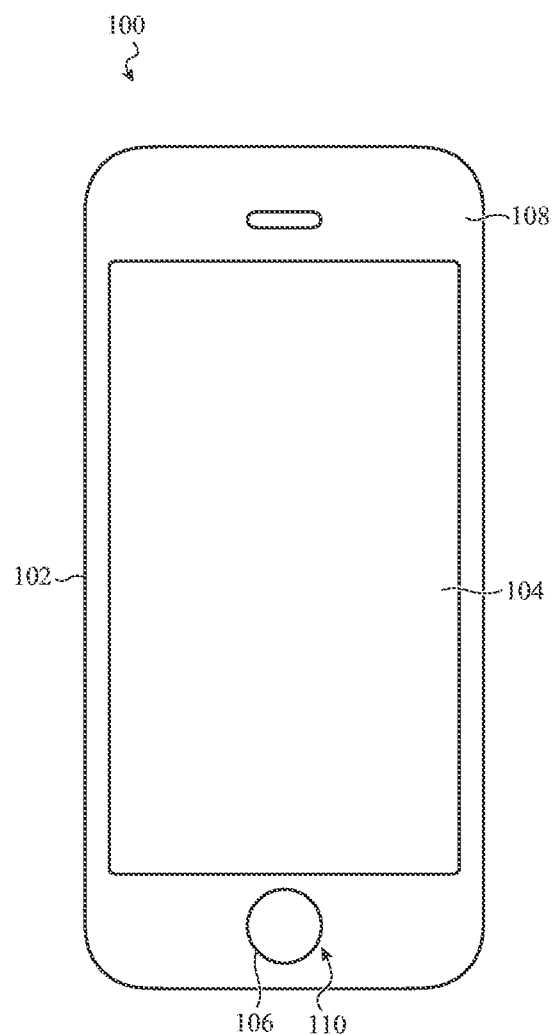
FIG. 1 shows one example of an electronic device that can include a force sensor in one or more input devices.

The cross-hatching in the figures is provided to distinguish the elements or components from one another. The cross-hatching is not intended to indicate a type of material or materials or the nature of the material(s).

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to an input device that includes one or more force sensors. The input device can be included in an electronic device and/or operably connected to an electronic device through a wired or wireless connection. In one embodiment, the input device is an input button, but any suitable input device can include a force sensor.

In a particular embodiment, the force sensor includes two circuit layers in a stack of components that form the input device. The circuit layers are spaced apart from each other and a compliant material or air is disposed between the circuit layers. Each circuit layer includes a set of one or more electrodes, and each electrode in one set is aligned in at least one direction (e.g., vertically) with a respective electrode in the other set to produce one or more capacitors. When a force is applied to a cover element of the input device, the cover element bends or deflects which causes at least one electrode in one circuit layer to move closer to a respective electrode in the other circuit layer. The capacitance of the capacitor formed by the two electrodes varies as the distance between the electrodes changes. A force signal sensed from each capacitor represents a capacitance measurement of that capacitor. A processing device is configured to receive the force signal(s) and correlate the force signal(s) to an amount of force applied to the cover element.

In another embodiment, the force sensor is included in a compliant layer positioned at one or more locations within the input device. In one non-limiting example, when the input device is an input button, the compliant layer may be positioned around a periphery of the input button. The compliant layer may be formed with a compliant material disposed between two circuit layers. Each circuit layer includes a set of one or more electrodes, and each electrode in one set is aligned in at least one direction (e.g., vertically) with a respective electrode in the other set to produce one or more capacitors. When a force is applied to an input surface of the input device, the compliant material compresses or deforms, which causes at least one electrode in one circuit layer to move closer to a respective electrode in the other circuit layer. The capacitance of the capacitor formed by the two electrodes varies as the distance between the electrodes decreases. A processing device is configured to receive force signals from the capacitor(s) and correlate the force signals to an amount of applied force.

In some embodiments, the input device can include additional components that receive one or more inputs from a user in addition to a force input. For example, in one embodiment the input device includes a biometric sensor. In a non-limiting example, the biometric sensor is a fingerprint sensor that captures at least one fingerprint when a user's finger (or fingers) approaches and/or contacts the input surface.

Additionally or alternatively, the input device may include a switch element that detects a user input when a force input exceeds a given amount of force. Any suitable switch element can be used. For example, an input device can include a dome switch that collapses when a force applied to an input surface exceeds a given magnitude. When collapsed, the dome switch completes a circuit that is detected by a processing device and recognized as an input (e.g., a selection of an icon, function, or application).

In many embodiments, force can function as a non-binary input. A force sensor can be configured to detect different amounts of force and the different amounts of force can be associated with different inputs to the electronic device, to an application, and/or to a function. For example, an increasing amount of force applied to an input device can be used to increase a level of sound output by a speaker in an electronic device. Additionally or alternatively, a first amount of force can be associated with a first input for an electronic device while a different second amount of force may be associated with a second input. For example, a first amount of force can be used to wake the electronic device from a sleep state while a larger second amount of force may be used to turn off the electronic device. Additionally or alternatively, increasing or decreasing amounts of force can be used to control an operation in a gaming application. For example, an increasing amount of force may increase the speed of a moving object in a game (e.g., a car) while decreasing the amount of force can reduce the speed of the moving object. The absence of a force input may be used as a braking function to stop the movement of the object.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of an input button or sensor, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

These and other embodiments are discussed below with reference to FIGS. 1-12. However, those skilled in the art will readily appreciate that the detailed description given herein with respect to these Figures is for explanatory purposes only and should not be construed as limiting.

FIG. 1 shows one example of an electronic device that can include a force sensor in one or more input devices. In the illustrated embodiment, the electronic device 100 is implemented as a smart telephone. Other embodiments can implement the electronic device differently. For example, an electronic device can be a laptop computer, a tablet computing device, a wearable computing device such as a smart watch or a health assistant, a digital music player, a display input device, a remote control device, and other types of electronic devices that include one or more input devices.

The electronic device 100 includes a housing 102 surrounding a display 104 and an input device 106. In some embodiments, the input device 106 can be configured as an input/output device. As used herein, the phrase "input device" is intended to include both input devices and input/output devices.

The housing 102 can form an outer surface or partial outer surface for the internal components of the electronic device 100, and may at least partially surround the display 104 and/or the input device 106. The housing 102 can be formed of one or more components operably connected together, such as a front piece and a back piece. Alternatively, the housing 102 can be formed of a single piece operably connected to the display 104.

The display 104 can provide a visual output for the electronic device 100 and/or function to receive user inputs to the electronic device. For example, the display 104 can be a multi-touch capacitive sensing touchscreen that can detect one or more user touch and/or force inputs. The display 104 may be substantially any size and may be positioned substantially anywhere on the electronic device 100. The display 104 can be implemented with any suitable display, including, but not limited to, a multi-touch sensing touchscreen device that uses liquid crystal display (LCD) element, light emitting diode (LED) element, organic light-emitting display (OLED) element, or organic electro luminescence (OEL) element.

In some embodiments, the input device 106 can take the form of a home button, which may be a mechanical button, a soft button (e.g., a button that does not physically move but still accepts inputs), an icon or image on a display, and so on. Further, in some embodiments, the input device 106 can be integrated as part of a cover layer 108 and/or housing of the electronic device. Although not shown in FIG. 1, the electronic device 100 can include one or more other input devices, such as a microphone, a speaker, other input buttons (e.g., volume, on-off), a camera, and one or more ports such as a network communication port and/or a power cord port.

The cover layer 108 may be positioned over the front surface of the electronic device 100. At least a portion of the cover layer 108 can receive touch and/or force inputs. In one embodiment, the cover layer 108 covers the display 104 and the input device 106. Touch and force inputs can be received by the portions of the cover layer 108 that cover the display 104 and/or by the portion of the cover layer 108 that covers the input device 106. In another embodiment, the cover layer 108 covers the display 104 but not the input device 106. In such embodiments, the input device 106 can be positioned in an opening or aperture 110 formed in the cover layer 108. The input device 106 can receive touch and/or force inputs as well as the portion of the cover layer 108 that covers the display 104.

In other embodiments, the input surface of the input device may be integrated into the housing 102. For example, the input surface may be part of the housing 102 with the force sensor and other components of the input device disposed below the housing 102. A depression or recess in the housing 102 may indicate the location of an input device (e.g., an input button).

A force sensor or sensors can be included in one or more locations of the electronic device 100. For example, in one embodiment one or more force sensors may be included in the input device 106 (and/or in other input buttons or areas of the electronic device 100). The force sensor(s) can be used to measure an amount of force and/or a change in force that is applied to the input device 106. Additionally or alternatively, one or more force sensors can be positioned under at least a portion of the housing 102 to detect a force and/or a change in force that is applied to the housing 102. Additionally or alternatively, one or more force sensors may be included in a display stack of the display 104. The force sensor(s) can be used to measure an amount of force and/or a change in force that is applied to the display 104 or to a portion of the display 104.

Embodiments described herein include one or more force sensors in the input device 106. As described earlier, the input device 106 may also include additional operations or devices, such as a biometric sensor, other circuitry, support elements, and/or a switch element. In one embodiment, the various components and devices can be arranged in a device stack that is positioned below a cover element.

Figure 2A:
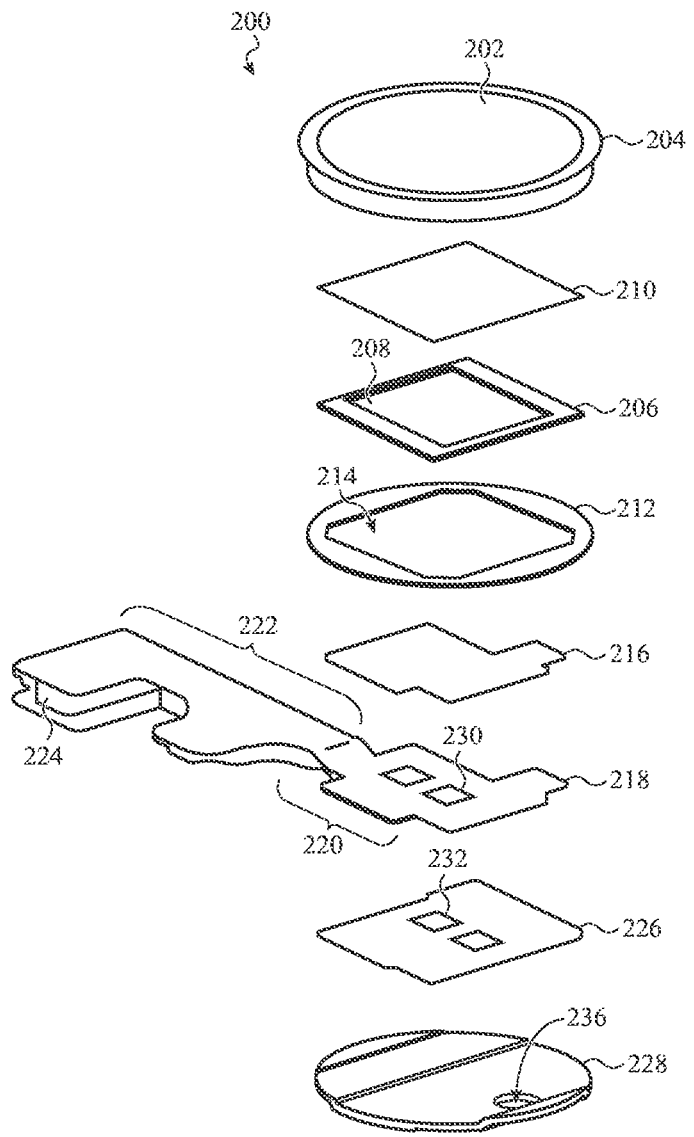
FIGS. 2A-2B show exploded views of a first input device that is suitable for use in the electronic device shown in FIG. 1.
Figure 2B:
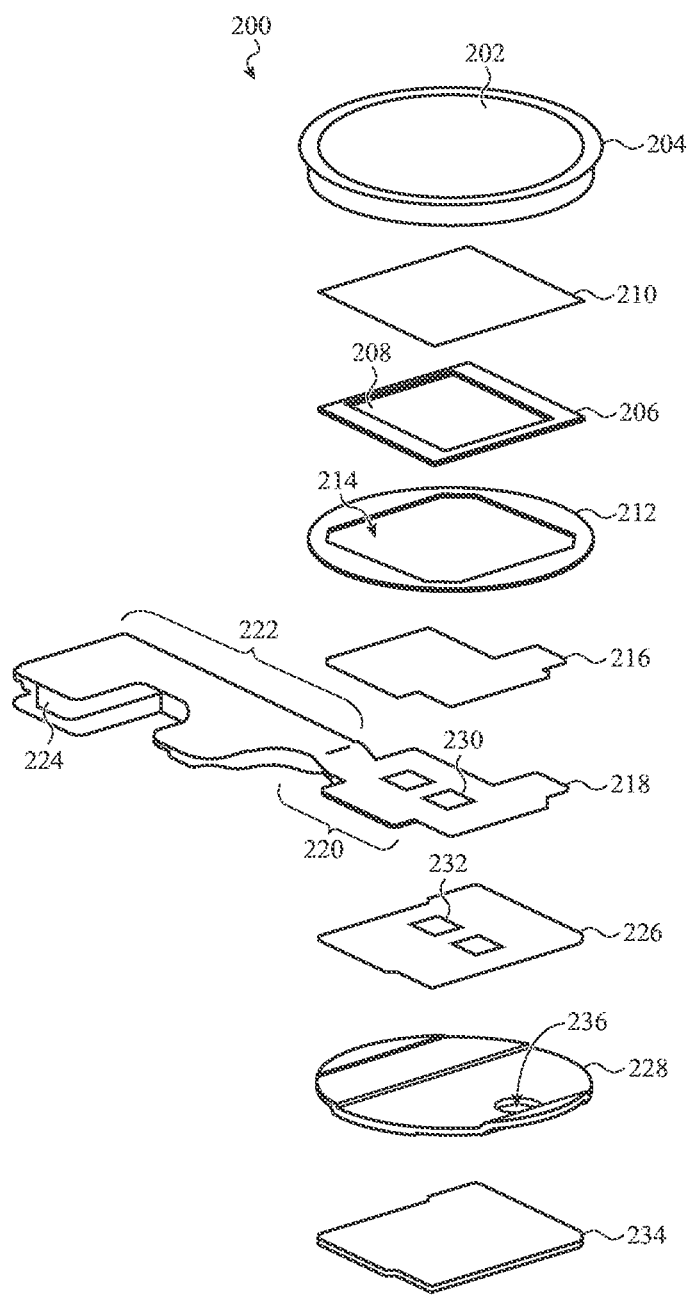

FIGS. 2A-2B show exploded views of a first input device suitable for use in the electronic device shown in FIG. 1. With reference to FIG. 2A, the input device stack 200 includes a cover element 202 and a trim 204. In the illustrated embodiment, the trim 204 completely surrounds the sides of the cover element 202 and the perimeter of the top surface of the cover element 202. Other embodiments are not limited to this configuration. For example, in one embodiment the sides and/or top surface of the cover element 202 can be partially surrounded by the trim 204. Alternatively, the trim 204 can be omitted in other embodiments.

Both the cover element 202 and the trim 204 can be formed with any suitable opaque, transparent, and/or translucent material. For example, the cover element 202 can be made of glass, plastic, or sapphire and the trim 204 may be made of a metal or plastic. In some embodiments, one or more additional layers (not shown) can be positioned below the cover element 202. For example, an opaque ink layer can be disposed below the cover element 202 when the cover element 202 is made of a transparent material. The opaque ink layer can conceal the other components in the input device stack 200 so that the other components are not visible through the transparent cover element 202.

A first circuit layer 206 can be disposed below the cover element 202. Any suitable circuit layer may be used. For example, the first circuit layer 206 may be a circuit board or a flexible circuit. The first circuit layer 206 can include one or more circuits, signal lines, and/or integrated circuits. In one embodiment, the first circuit layer 206 includes a biometric sensor 208. Any suitable type of biometric sensor can be used. For example, in one embodiment the biometric sensor is a capacitive fingerprint sensor that captures at least one fingerprint when a user's finger (or fingers) approaches and/or contacts the cover element 202.

The first circuit layer 206 may be attached to the bottom surface of the cover element 202 with an adhesive layer 210. Any suitable adhesive can be used for the adhesive layer. For example, a pressure sensitive adhesive layer may be used as the adhesive layer 210.

A compliant layer 212 is disposed below the first circuit layer 206. In one embodiment, the compliant layer 212 includes an opening 214 formed in the compliant layer 212. The opening 214 exposes the top surface of the first circuit layer 206 and/or the biometric sensor 208 when the device stack 200 is assembled. In the illustrated embodiment, the compliant layer 212 is positioned around an interior perimeter of the trim 204 and/or around a peripheral edge of the cover element 202 (see FIG. 3). Although depicted in a circular shape, the compliant layer 212 can have any given shape and/or dimensions, such as a square or oval. The compliant layer 212 is shown as a continuous compliant layer in FIG. 2, but other embodiments are not limited to this configuration. In some embodiments, multiple discrete compliant layers may be used in the device stack 200. Additionally, in some embodiments, the compliant layer 212 does not include the opening 214 and the compliant layer 212 extends across at least a portion of the input device stack 200. For example, the compliant layer 212 may extend across the bottom surface of the cover element 202, the bottom surface of the first circuit layer 206, or a portion of the bottom surface of the cover element 202 (e.g., around the peripheral edge of the cover element) and the bottom surface of the first circuit layer 206.

A second circuit layer 218 is positioned below the first circuit layer 206. A flexible circuit and a circuit board are examples of a circuit layer that can be used in the second circuit layer 218. In some embodiments, the second circuit layer 218 can include a first circuit section 220 and a second circuit section 222. The first and second circuit sections 220, 222 can be electrically connected one another other.

The first circuit section 220 can include a first set of one or more force sensor components that are included in a force sensor. In some embodiments, the first circuit section 220 can be electrically connected to the first circuit layer 206. For example, when the first circuit layer 206 includes a biometric sensor 208, the biometric sensor 208 may be electrically connected to the first circuit section 220 of the second circuit layer 218.

The second circuit section 222 can include additional circuitry, such as signal lines, circuit components, integrated circuits, and the like. In one embodiment, the second circuit section 222 may include a board-to-board connector 224 to electrically connect the second circuit layer 218 to other circuitry in the electronic device. For example, the second circuit layer 218 can be operably connected to a processing device using the board-to-board connector 224. Additionally or alternatively, the second circuit layer 218 may be operably connected to circuitry that transmits signals (e.g., sense signals) received from the force sensor component(s) in the first circuit section 220 to a processing device. Additionally or alternatively, the second circuit layer 218 may be operably connected to circuitry that provides signals (e.g., drive signals, a reference signal) to the one or more force sensor components in the first circuit section 220.

In some embodiments, the first circuit section 220 of the second circuit layer 218 may be attached to the bottom surface of the first circuit layer 206 using an adhesive layer 216. In a non-limiting example, a die attach film may be used to attach the first circuit section 220 to the bottom surface of the first circuit layer 206.

A third circuit layer 226 is disposed below the first circuit section 220 of the second circuit layer 218. The third circuit layer 226 may include a second set of one or more force sensor components that are included in a force sensor. The third circuit layer 226 is supported by and/or attached to a support element 228. In one embodiment, the support element 228 is attached to the trim 204 to produce an enclosure for the other components in the device stack 200. The support element 228 may be attached to the trim 204 using any suitable attachment mechanism.

The first set of one or more force sensor components in the first circuit section 220 and the second set of one or more force sensor components in the third circuit layer 226 together form a force sensor. The force sensor can use any suitable force sensing technology. Example sensing technologies include, but are not limited to, capacitive, piezoelectric, piezoresistive, ultrasonic, and magnetic.

In the embodiments described herein, the force sensor is a capacitive force sensor. With a capacitive force sensor, the first set of one or more force sensor components can include a first set of one or more electrodes 230 and the second set of one or more force sensor components a second set of one or more electrodes 232. Although shown in a square shape in FIGS. 2A and 2B, each electrode in the first and second sets of one or more electrodes 230, 232 can have any given shape (e.g., rectangles, circles). Additionally, the one or more electrodes in the first and second sets 230, 232 may be arranged in any given pattern (e.g., one or more rows and one or more columns).

FIGS. 2A and 2B show two electrodes in the first and second sets of one or more electrodes 230, 232. However, other embodiments are not limited to this configuration. The first and second sets of one or more electrodes 230, 232 may each be a single electrode or multiple discrete electrodes. For example, if the first set of one or more electrodes is a single electrode, the second set of one or more electrodes comprises multiple discrete electrodes. In some embodiments, the second set of one or more electrodes can be a single electrode and the first set includes multiple discrete electrodes. Alternatively, both the first and second sets of one or more electrodes may each include multiple discrete electrodes.

Each electrode in the first set of one or more electrodes 230 is aligned in at least one direction (e.g., vertically) with a respective electrode in the second set of one or more electrodes 232 to produce one or more capacitors. When a force input is applied to the cover element 202 (e.g., the input surface of the input device), at least one electrode in the first set 230 moves closer to a respective electrode in the second set 232, which varies the capacitance of the capacitor(s). A force signal sensed from each capacitor represents a capacitance measurement of that capacitor. A processing device (not shown) is configured to receive the force signal(s) and correlate the force signal(s) to an amount of force applied to the cover element 202.

In some embodiments, the force sensor is configured to detect a range of force inputs with at least two force inputs representing different user inputs. For example, a first force input can select an icon and a different second force input can turn off an electronic device. Additionally or alternatively, in another example a first force input can produce a scrolling operation that scrolls at a first speed and a different second force input may produce a scrolling operation that scrolls at a different second speed (e.g., faster). Additionally or alternatively, in some embodiments the force sensor can replace other components in an input device. For example, a force sensor may replace a switch element.

In other embodiments, such as the embodiment shown in FIG. 2B, a switch element 234 can be positioned below the support element 228. The switch element 234 registers a user input when a force input applied to the cover element 202 exceeds a given amount of force (e.g., a force threshold associated with closing the distance between the first circuit section 220 and the third circuit layer 226; see FIG. 3). Any suitable switch element can be used. For example, the switch element 234 may be a dome switch that collapses when the force input applied to the cover element 202 exceeds the force threshold. When collapsed, the dome switch completes a circuit that is detected by a processing device and recognized as a user input (e.g., a selection of an icon, function, or application). In one embodiment, the dome switch is arranged such that the apex of the collapsible dome is proximate to the bottom surface of the support plate 228. In another embodiment, the base of the collapsible dome can be proximate to the bottom surface of the support plate 228.

Figure 3:
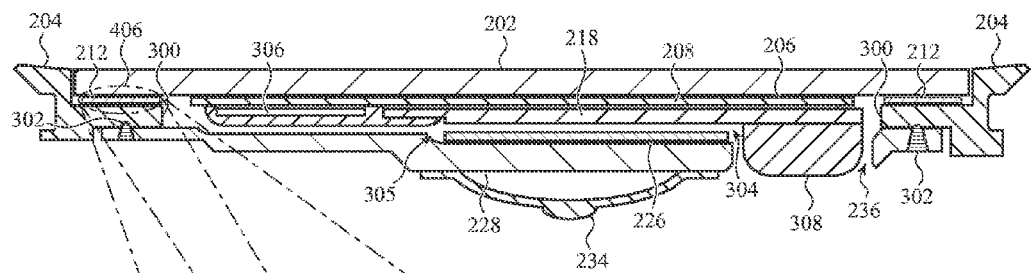
FIG. 3 shows a cross-sectional view of the input device shown in FIG. 2B when the input device is assembled.

FIG. 3 shows a cross-sectional view of the input device shown in FIG. 2B when the input device is assembled. In some embodiments, the trim 204 is positioned in an aperture formed in the housing of an electronic device (e.g., aperture 1010 in housing 102 in FIG. 1). In the illustrated embodiment, the trim 204 includes a shelf 300 that extends inward from the trim 204 toward the input device stack. The compliant layer 212 is positioned between the shelf 300 and a peripheral edge of the cover element 202. The compliant layer 212 may be made of any suitable material or materials. For example, in one embodiment the compliant layer 212 is a silicone layer.

Figure 4:
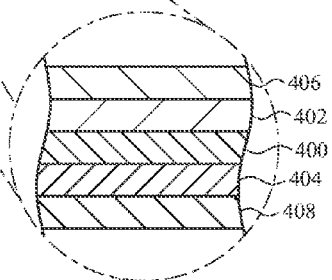
FIG. 4 shows an exploded view of one example of the compliant layer shown in FIG. 3.

In another embodiment, the compliant layer 212 can be formed as shown in FIG. 4. A compliant material 400 may be positioned between two intermediate layers 402, 404. An exterior layer 406, 408 can be disposed over each intermediate layer 402, 404. In one non-limiting embodiment, the compliant material 400 may be formed with silicone, the intermediate layers 402, 404 can be formed with a polyimide, and the exterior layers 406, 408 may be formed with a heat activated film.

Figure 5:
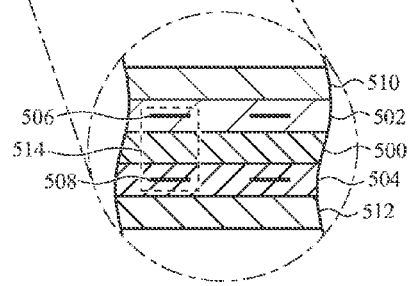
FIG. 5 shows an exploded view of another example of the compliant layer shown in FIG. 3.

FIG. 5 shows an exploded view of another example of the compliant layer shown in FIG. 3. A compliant material 500 may be positioned between two circuit layers 502, 504. A first set of one or more force sensor components 506 is formed in or on the first circuit layer 502. Similarly, a second set of one or more force sensor components 508 is formed in or on the second circuit layer 504. In the illustrated embodiment, the first and second sets of one or more force sensor components each include one or more electrodes.

An exterior layer 510, 512 can be disposed over each circuit layer 502, 504. In one non-limiting embodiment, the compliant material 500 may be formed with silicone, each circuit layer 502, 504 can be formed with a flexible circuit that includes a set of one or more electrodes (e.g., 230, 232), and each exterior layer 510, 512 may be formed with a heat activated film.

The circuit layers 502, 504 allow the compliant layer 212 to act as a second force sensor. The second force sensor can be used in series, concurrently, or offset in time with the first force sensor formed by the second and third circuit layers 218, 226. For example, one force sensor (e.g., the second force sensor) can be used initially to detect an amount of applied force. As the amount of applied force increases, the force sensor reaches a maximum detectable force. At this point, the other force sensor (e.g., the first force sensor) may be used to detect the applied force. Alternatively, in some embodiments, both the first and second force sensors can be used to detect force inputs up to a given amount of force, and then one of the force sensors may be used to detect force inputs greater than the given amount of force.

The second capacitive force sensor operates similarly to the first capacitive force sensor. Each electrode in the first set of one or more electrodes 506 is aligned in at least one direction (e.g., vertically) with a respective electrode in the second set of one or more electrodes 508 to produce one or more capacitors 514. As described earlier, the capacitance of at least one capacitor 514 can vary when a user applies a force to the cover element 202 because the electrodes in at least one capacitor 514 move closer together. A user can apply the force to the cover element 202 with a device, such as a stylus, or with a body part (e.g., one or more fingers). Force signals produced by the one or more capacitors 514 represent capacitance measurement(s) of the one or more capacitors 514. A processing device that receives the force signal(s) is configured to correlate the force signal(s) to an amount of force applied to the cover element 202.

Retuning to FIG. 3, the compliant layer 212 can seal the interface between the bottom surface of the cover element 202 and the top surface of the shelf 300. In some embodiments, the compliant layer 212 may act as an environmental seal that prevents contaminants, such as water, chemicals, and dirt, from entering the input device stack and/or the electronic device.

The first circuit layer 206 (with the biometric sensor 208) is positioned below the cover element 202, and the second circuit layer 218 is positioned below the first circuit layer 206. The third circuit layer 226 is disposed below the second circuit layer 218 and over the support element 228. In the illustrated embodiment, the support element 228 is attached to the trim 204 using fasteners 302. Any suitable type of fastener may be used, such as a screw, solder, and an adhesive.

In the illustrated embodiment, a gap 304 is defined between the second and third circuit layers 218, 226. The gap 304 is formed based at least in part by the downward step 305 in the support element 228. As described earlier, when the force sensor is a capacitive force sensor, the electrode(s) in the first and second sets of one or more electrodes form a capacitor. The gap 304 separates the electrodes in the first and second sets and includes the dielectric material for the capacitor(s). Any suitable dielectric material can be used. For example, the dielectric material can include, but is not limited to, air, a compliant gel, a compliant material, and/or one or more compliant elements disposed between the second and third circuit layers 218, 226.

In the illustrated embodiment, the cover element 202 and the trim 204 are fixed in position and do not move when a force is applied to the cover element 202. The gap 304 permits the first circuit section 220 of the second circuit layer 218 to bend or deflect relative to the third circuit layer 226 when a force input is applied to the cover element 202. This deflection varies the capacitance of one or more capacitors formed by the electrode(s) in the first circuit section 220 and third circuit layer 226.

In some embodiments, additional circuitry and/or components may be attached and electrically connected to the second circuit layer 218. For example, a second integrated circuit 306 may be attached and electrically connected to the second circuit layer 218. In some embodiments, some additional circuitry may be encapsulated with a protective and/or insulting material 308. The protective and/or insulating material 308 can filter noise from signals and circuitry in or on the second circuit layer 218. In the illustrated embodiment, the protective and/or insulating material 308 extends into an opening 236 formed in the support element 228 (see FIGS. 2A-2B).

As discussed earlier, a switch element 234 may be disposed below the support element 228. The switch element 234 is depicted as a dome switch in FIG. 3. As shown, the dome switch is arranged such that the base of the collapsible dome is proximate (e.g., attached) to the bottom surface of the support plate 228. In other embodiments, the apex of the collapsible dome may be proximate to, or in contact with, the bottom surface of the support plate 228.

Figure 6:
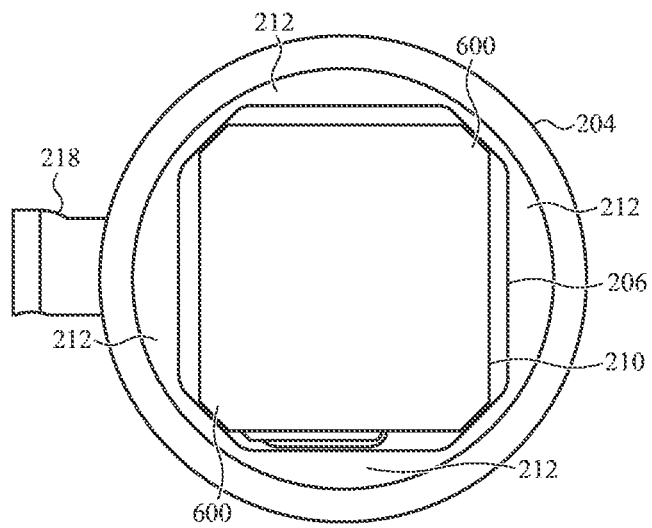
FIG. 6 shows one example of a top view of the input device shown in FIG. 3.

FIG. 6 shows one example of a top view of the input device shown in FIG. 3. The cover element 202 is omitted for clarity. In this example embodiment, the compliant layer 212 is formed as a continuous ring of compliant material that is positioned around the trim 204 (e.g., over shelf 300 of the trim 204 in FIG. 3). As discussed earlier, the compliant layer 212 may act as an environmental seal that prevents contaminants, such as water, chemicals, and dirt, from entering the input device stack and/or the electronic device. In such embodiments, the corners 600 of the first circuit layer 206 (and/or the biometric sensor 208) may be notched to ensure the compliant layer 212 meets all standards for an environmental seal, such as a width requirement.

The adhesive layer 210 is used to attach the first circuit layer 206 to the bottom surface of the cover element. Additionally, in some embodiments the second circuit layer 218 extends beyond the trim 204 and folds over itself to provide a circuit layer. For example, in some embodiments the third circuit layer 226 can be a part of the second circuit layer 218 that is folded over and positioned over the support element 228.

Figure 7:
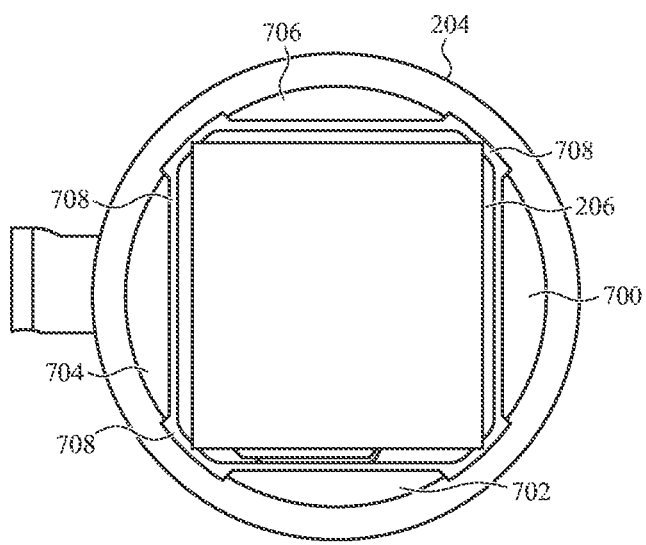
FIG. 7 shows another example of a top view of the input device shown in FIG. 3.

FIG. 7 shows another example of a top view of the input device shown in FIG. 3. Again, the cover element 202 is omitted for clarity. In this example embodiment, the compliant layer 212 is formed as discrete compliant layers 700, 702, 704, 706 that are positioned at different locations around the trim 204 (e.g., over the shelf 300 in FIG. 3). In such embodiments, the edges and corners of the first circuit layer 206 do not have to be modified or notched. Additionally or alternatively, in some embodiments the dimensions or size of the biometric sensor can be larger when discrete compliant layers are included in the input device. Although only four discrete compliant layers are shown in FIG. 7, other embodiments can include any number of discrete compliant layers.

An environmental seal can be formed with a material that fills the gaps 708 around the discrete compliant layers 700, 702, 704, 706 and between the cover element 202 and the trim 204. In one embodiment, the material is water and chemical resistance and is compliant relative to the discrete compliant layers 700, 702, 704, 706. The environmental seal prevents contaminants such as liquid, dirt, and dust from entering the input device stack and/or the electronic device. In a non-limiting example, a glue may be used to form the environmental seal.

Figure 8:
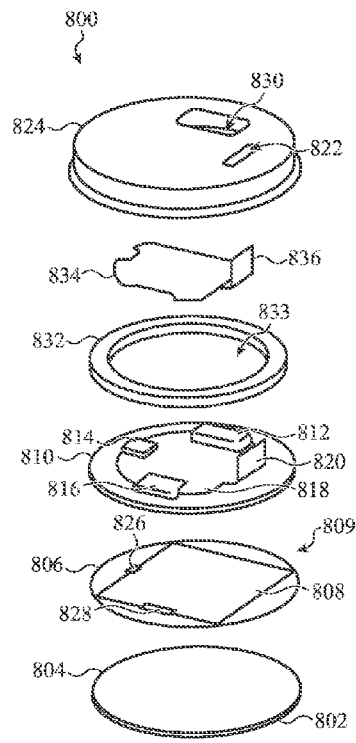
FIG. 8 shows an exploded view of a second input device that is suitable for use in the electronic device shown in FIG. 1.

FIG. 8 shows an exploded view of a second input device that is suitable for use in the electronic device shown in FIG. 1. The input device stack 800 is inverted in FIG. 8, with the cover element 802 shown at the bottom of the figure. As described earlier, one or more additional layers 804 can be positioned below the cover element 802. The additional layer(s) can include, but are not limited to, an ink layer and/or an adhesive layer.

A first circuit layer 806 may be positioned below the cover element 802 (or below the additional layer(s) 804 when included in the input device stack 800). The first circuit layer 806 may be any suitable circuit layer, such as a circuit board or a flexible circuit. In one embodiment, the first circuit layer 806 includes a biometric sensor 808 formed on or in the first circuit layer 806 and operably connected to the first circuit layer 806. In a non-limiting example, the biometric sensor 808 is a fingerprint sensor.

In some embodiments, the first circuit layer 806 and the biometric sensor 808 can be molded into a plastic mold or enclosure 809. The plastic enclosure 809 can serve as an environmental seal for the first circuit layer 806 and the biometric sensor 808.

A support layer 810 can be disposed below the first circuit layer 806. The support layer 810 may include circuitry 812, 814, 816 electrically connected to a second circuit layer 818. The second circuit layer 818 may be a flexible circuit or a circuit board. In the illustrated embodiment, the second circuit layer 818 is a flexible circuit that includes a second circuit layer tail 820 that extends into the opening 822 in the trim 824.

In some embodiments, circuitry 812, 814, and/or 816 may be electrically connected to contacts 826, 828 on the first circuit layer 806. In some embodiments, at least a portion of circuitry 812 may extend into the opening 830 in the trim 824. The circuitry 812, 814, and/or 816 may be encapsulated with an insulating and/or protective material (not shown).

A compliant layer 832 is positioned below the support layer 810. In the illustrated embodiment, the compliant layer 832 includes an opening 833 that permits the compliant layer 832 to reside around the interior perimeter of the trim 824 and/or around a peripheral edge of the cover element 802. Although depicted in a circular shape, the compliant layer 832 can have any given shape and/or dimensions, such as a square or oval. As discussed earlier, the compliant layer 832 may include multiple discrete compliant layers in the device stack 800. Additionally or alternatively, the compliant layer 832 may not include the opening 833 such that the compliant layer 832 extends across at least a portion of the input device stack 800. For example, the compliant layer 832 may extend across the bottom surface of the cover element 802, the bottom surface of the first circuit layer 806, or a portion of the bottom surface of the cover element 802 (e.g., around the peripheral edge of the cover element) and the bottom surface of the first circuit layer 806.

The compliant layer 832 may be made of any suitable material or combination of materials. For example, in one embodiment the compliant layer 832 can be formed with silicone. In other embodiments, the compliant layer 832 can be constructed as shown in FIG. 4 or in FIG. 5. The compliant layer 832 may function as an additional force sensor when the compliant layer 832 is constructed as shown in FIG. 5.

A third circuit layer 834 may be disposed below the support layer 810. The third circuit layer 834 may be any suitable circuit layer, such as a circuit board or a flexible circuit. In the illustrated embodiment, the third circuit layer 834 is a flexible circuit that includes a circuit layer tail 836 that extends into the opening 822 of the trim 824.

The trim 824 forms a container or holder in that the trim 824 includes a cavity defined by the bottom surface and sides of the trim 824. When constructed, the cover element 802, the optional one or more additional layers 804, the first circuit layer 806, the support layer 810, the second circuit layer 818, the compliant layer 832, and the third circuit layer 834 all reside within the cavity of the trim 824. The bottom surface of the trim 824 acts as a support element for the third circuit layer 834.

In one embodiment, the second and third circuit layers 818, 834 each include a set of one or more force sensor components that are included in a force sensor. The force sensor can use any suitable sensing technology. For example, with a capacitive force sensor, the second and third circuit layers 818, 834 each include one or more electrodes (not shown) that are used to sense changes in capacitance. The electrode(s) may be configured as shown and described in conjunction with FIGS. 2A-2B. A processing device (not shown) receives force signals that represent capacitance values for the one or more capacitors formed by the electrode(s). A processing device (not shown) receives force signals from the one or more capacitors and correlates the force signals into an amount of force that is applied to the cover element 802.

Figure 9:
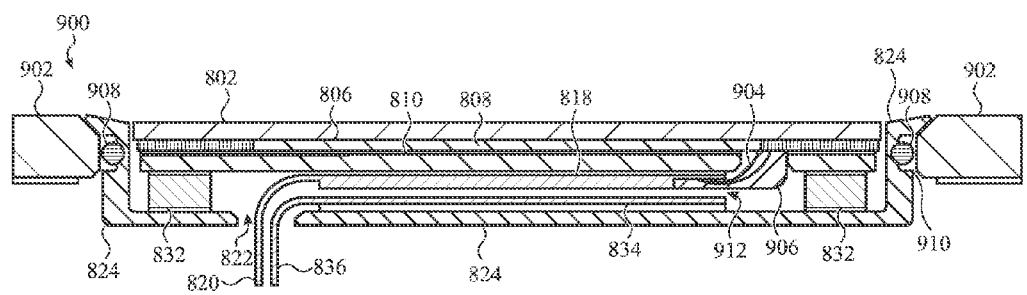
FIG. 9 shows a cross-sectional view of the second input device shown in FIG. 8 when the input device is assembled.

FIG. 9 shows a cross-sectional view of the second input device shown in FIG. 8 when the input device is assembled. In the illustrated embodiment, the trim 824 is positioned in an aperture 900 formed in the housing 902 of an electronic device (e.g., housing 102 in FIG. 1). Disposed within the trim 824 are the cover element 802 and the various layers of the input device stack 800 (e.g., the optional additional layer(s) 804, the first circuit layer 806, the support layer 810, the second circuit layer 818, the third circuit layer 834, and the compliant layer 832). The second circuit layer tail 820 and the third circuit layer tail 836 extend out of the trim 824 through the opening 822. The second and third circuit layer tails 820, 836 can be operably connected to other circuitry, such as a processing device and/or signal generator.

As discussed earlier, the second and third circuit layers 818, 834 can be included in a force sensor. The second and third circuit layers 818, 834 may each include a set of one or more force sensor components that are included in the force sensor. For example, with a capacitive force sensor the second and third circuit layers 818, 834 can each include a set of one or more electrodes (not shown). The one or more electrodes may be configured as shown and described in conjunction with FIGS. 2A-2B.

As described earlier, the second and third circuit layer tails 820, 836 may be operably connected to one or more processing devices (not shown). The force signals received from the force sensor (e.g., capacitor(s) formed with electrodes) can be transmitted to a processing device using one circuit layer tail (e.g., second circuit layer tail 820). Additionally, drive or reference signals may be transmitted to the force sensor (e.g., capacitor(s) formed with electrodes) using the other circuit layer tail (e.g., third circuit layer tail 836).

A gap 912 is defined between the second and third circuit layers 818, 834. As described earlier, when the force sensor is a capacitive force sensor, the gap 912 includes the dielectric material for the capacitor(s) that is formed with the sets of one or more electrodes in the second and third circuit layers 818, 834. The gap 912 permits the second circuit layer 818 to move, bend, or deflect relative to the third circuit layer 834 when a force input is applied to the cover element 802. This deflection varies the capacitance of one or more capacitors formed by the electrode(s) in the second and third circuit layers 818, 834.

In the illustrated embodiment, the second circuit layer 818 is electrically connected to the first circuit layer 806 with bonding wires 904. The bonding wires 904 may be covered or encapsulated by a protective and/or insulating material 906.

In some embodiments, a seal 908 can be disposed between the trim 824 and the housing 902. In one embodiment, the seal is an O-ring that is positioned within an indentation 910 formed along an exterior surface of the trim 824. The seal 908 can function as an environmental seal that prevents contaminants such as liquid, dirt, and dust from entering the input device stack and/or the electronic device.

FIG. 10 shows an exploded view of a third input device that is suitable for use in the electronic device shown in FIG. 1. Like the embodiment shown in FIG. 8, the input device stack 1000 is shown inverted with the cover element 1002 shown at the bottom of the figure. In some embodiments, one or more additional layers 1004 can be positioned below the cover element 1002. The additional layer(s) can include, but are not limited to, an ink layer and/or an adhesive layer.

A first circuit layer 1006 may be positioned below the cover element 1002 (or below the additional layer(s) 1004 when included in the input device stack 1000). The first circuit layer 1006 may be any suitable circuit layer, such as a circuit board or a flexible circuit. In one embodiment, the first circuit layer 1006 includes a biometric sensor 1008 formed on or in the first circuit layer 1006 and operably connected to the first circuit layer 1006. In a non-limiting example, the biometric sensor 1008 is a fingerprint sensor.

Like the embodiment shown in FIG. 8, the first circuit layer 1006 and the biometric sensor 1008 can be molded into a plastic mold or enclosure 1009. The plastic enclosure 1009 can serve as an environmental seal for the first circuit layer 1006 and the biometric sensor 1008.

A support layer 1010 can be disposed below the first circuit layer 1006. The support layer 1010 may include circuitry 1012, 1014, 1016 electrically connected to a second circuit layer 1018. The second circuit layer 1018 may be a flexible circuit or a circuit board. In some embodiments, the circuitry 1012, 1014, and/or 1016 may be electrically connected to one or both contacts 1020, 1022 on the first circuit layer 1006. In some embodiments, at least a portion of the circuitry 1012, 1014, and/or 1016 may extend into the opening 1024 in the trim 1026.

A compliant layer 1028 is positioned below the support layer 1010. In the illustrated embodiment, the compliant layer 1028 includes an opening 1030 that permits the compliant layer 1028 to reside around the interior perimeter of the trim 1026 and/or a peripheral edge of the cover element 1002. Although depicted in a circular shape, the compliant layer 1028 can have any given shape and/or dimensions, such as a square or an oval. As discussed earlier, in some embodiments the compliant layer 1028 may be configured as multiple discrete compliant layers in the device stack 1000. Additionally or alternatively, the compliant layer 1018 may not include the opening 1024 such that the compliant layer 1028 extends across at least a portion of the input device stack 1000. For example, the compliant layer 1028 may extend across the bottom surface of the cover element 1002, the bottom surface of the first circuit layer 1006, or a portion of the bottom surface of the cover element 1002 (e.g., around the peripheral edge of the cover element) and the bottom surface of the first circuit layer 1006.

The compliant layer 1028 may be made of any suitable material or combination of materials. For example, in the illustrated embodiment the compliant layer 1028 functions as a force sensor and is constructed as shown in FIG. 5. The compliant layer 1028 includes a compliant layer tail 1032 that extends out of the opening 1024 (see FIG. 11). The compliant layer tail 1032 is described in more detail in conjunction with FIG. 11.

When constructed, the cover element 1002 and the various layers of the input device stack 1000 (e.g., the optional one or more additional layers 1004, the first circuit layer 1006, the support layer 1010, and the compliant layer 1028) all reside within the trim 1026. FIG. 11 shows a cross-sectional view of the third input device shown in FIG. 10 when the input device is assembled. In the illustrated embodiment, the trim 1026 is positioned in an aperture 1100 formed in the housing 1102 of an electronic device (e.g., housing 102 in FIG. 1). Disposed within the trim 1026 are the cover element 1002, the first circuit layer 1006, the biometric sensor 1008, the support layer 1010, the second circuit layer 1018, and the compliant layer 1028. The compliant layer tail 1032 extends out of the trim 1026 through the opening 1024.

In the illustrated embodiment, the compliant layer 1028 is constructed as shown in FIG. 5 and functions as a capacitive force sensor. The compliant layer tail 1032 includes a first flexible circuit 1104 and a second flexible circuit 1106. Both the first and second flexible circuits 1104, 1106 each include one or more electrodes in at least the portion of the compliant layer 1028 that is disposed around the interior perimeter of the trim 1026. For example, in one embodiment the electrode(s) can be configured as shown and described in conjunction with FIG. 5.

The flexible circuits 1104, 1106 are operably connected to a processing device (not shown). The processing device is adapted to cause a reference or drive signal to be transmitted by one of the flexible circuits (e.g., 1104) to the one or more electrodes in that flexible circuit. The other flexible circuit (e.g., 1106) receives force signals from the one or more capacitors in formed by the electrodes and transmits the force signals to a processing device (not shown). The processing device is adapted to correlate the force signals into an amount of force that is exerted on the cover element 1002.

In some embodiments, a seal 1108 can be disposed between the trim 1026 and the housing 1102. In one embodiment, the seal is an O-ring that is positioned within an indentation 1110 formed along an exterior surface of the trim 1026. The seal 1108 can function as an environmental seal that prevents contaminants such as liquid, dirt, and dust from entering the input device stack and/or the electronic device.

It should be noted that the embodiments shown in FIGS. 2 and 3, FIGS. 8 and 9, and FIGS. 10 and 11 are exemplary only. In other examples, the input device may include fewer or more components than those described and/or shown in the figures. For example, the first circuit layer 206, 806, 1006 and the biometric sensor 208, 808, 1008 can be omitted in some embodiments. Additionally or alternatively, the switch element 234 may be omitted from the embodiment shown in FIGS. 2B and 3, or the switch element 234 may be included in the embodiments illustrated in FIGS. 8 and 9 and/or FIGS. 10 and 11.

Although the input device 106 is shown in FIG. 1 as a circular input device, other embodiments are not limited to this configuration. An input device can have any given shape and/or dimensions. Similarly, the shape and/or dimensions of the components shown in FIGS. 2-11 are illustrative only. Each component may have any given shape and/or dimensions.

Figure 12:
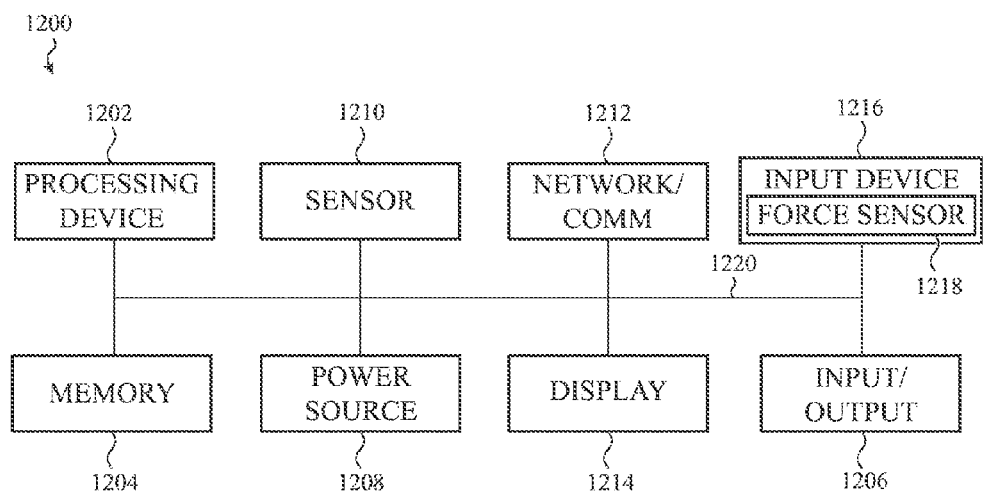
FIG. 12 shows a block diagram of one example of an electronic device that can include a force sensor in one or more input devices.

FIG. 12 shows a block diagram of one example of an electronic device that can include a force sensor in one or more input devices. The electronic device 1200 can include one or more processing devices 1202, memory 1204, one or more input/output devices 1206, a power source 1208, one or more sensors 1210, a network/communication interface 1212, a display 1214, and one or more input devices 1216 that include at least one force sensor 1218. Each of these components is discussed in more detail below.

The one or more processors 1202 can control some or all of the operations of the electronic device 1200. The processing device(s) 1202 can communicate, either directly or indirectly, with substantially all of the components of the device. For example, one or more system buses 1220 or other communication mechanisms can provide communication between the processing device(s) 1202, the memory 1204, the input/output device(s) 1206, the power source 1208, the one or more sensors 1210, the network/communication interface 1212, the display 1214, the input device(s) 1216, and/or the force sensor(s) 1218. The processing device(s) 1202 can be implemented as any electronic device capable of processing, receiving, or transmitting data or instructions. Additionally, the processing device 1202 can be configured to receive the force signals from the force sensor 1218 and correlate the force signals to an amount of force. For example, the one or more processing devices 1202 can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements.

The memory 1204 can store electronic data that can be used by the electronic device 1200. For example, the memory 1204 can store electrical data or content such as audio files, document files, timing and control signals, and image data. The memory 1204 can be configured as any type of memory. By way of example only, memory 1204 can be implemented as random access memory, read-only memory, Flash memory, removable memory, or other types of storage elements, in any combination.

The one or more input/output devices 1206 can transmit and/or receive data to and from a user or another electronic device. Example input/output device(s) 1206 include, but are not limited to, a touch sensing input device such as a touchscreen or track pad, a microphone, a vibration or haptic device, and/or a speaker.

The power source 1208 can be implemented with any device capable of providing energy to the electronic device 1200. For example, the power source 1208 can be one or more batteries or rechargeable batteries, or a connection cable that connects the electronic device to another power source such as a wall outlet.

The electronic device 1200 may also include one or more sensors 1210 positioned substantially anywhere on or in the electronic device 1200. The sensor or sensors 1210 may be configured to sense substantially any type of characteristic, such as but not limited to, images, atmospheric pressure, light, touch, temperature, heat, movement, relative motion, biometric data, and so on. For example, the sensor(s) 1210 may be an image sensor, a temperature sensor, a light or optical sensor, an accelerometer, a gyroscope, a magnet, a barometer, a health monitoring sensor, and so on.

The network communication interface 1212 can facilitate transmission of data to or from other electronic devices. For example, a network communication interface can transmit electronic signals via a wireless and/or wired network connection. For example, in one embodiment a communication signal is transmitted to a transmitter device and/or to a receiver device to permit the transmitter and receiver devices to communication with one another. Examples of wireless and wired network connections include, but are not limited to, cellular, Wi-Fi, Bluetooth, infrared (IR), Ethernet, and Near Field Communication (NFC).

The display 1214 can provide a visual output to the user. The display 1214 can be implemented with any suitable technology, including, but not limited to, a multi-touch sensing touchscreen that uses liquid crystal display (LCD) element, light emitting diode (LED) element, organic light-emitting display (OLED) element, organic electroluminescence (OEL) element, or another type of display element. In some embodiments, the display 1214 can function as an input device that allows the user to interact with the electronic device 1200. For example, the display can be a multi-touch touchscreen display.

The electronic device 1200 further includes one or more input devices 1216. Each input device 1216 can include a force sensor 1218 that is configured as one of the force sensors shown in FIGS. 2 and 3, 8 and 9, or 10 and 11. As described earlier, the processing device 1202 can process the force signals that are received from the force sensor(s) 1218 and correlate the force signals to an amount of force.

It should be noted that FIG. 11 is exemplary only. In other examples, the electronic device may include fewer or more components than those shown in FIG. 11. Additionally or alternatively, the electronic device can be included in a system and one or more components shown in FIG. 11 is separate from the electronic device but in communication with the electronic device. For example, an electronic device may be operatively connected to, or in communication with a separate display. As another example, one or more applications or data can be stored in a memory separate from the electronic device. As another example, a processing device in communication with the electronic device can control various functions in the electronic device and/or process data received from the electronic device. In some embodiments, the separate memory and/or processing device can be in a cloud-based system or in an associated device The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An input device for use with an electronic device, the input device comprising:
    a cover element;
    a compliant layer having a center opening, the compliant layer positioned adjacent and below the cover element;
    a fingerprint sensor positioned below the cover element and at least partially in the center opening, the fingerprint sensor configured to capture a fingerprint of a finger as the finger approaches or contacts the cover element; and
    a force sensor positioned below the fingerprint sensor and over a support element, the force sensor configured to detect a force input applied to the cover element; wherein
    the compliant layer comprises a first layer, a second layer, and a compliant material positioned between the first layer and the second layer.

2. The input device of claim 1, wherein the fingerprint sensor is operably connected to a first circuit layer and the fingerprint sensor and the first circuit layer are positioned below the cover element.

3. The input device of claim 1, wherein the force sensor comprises:
    a second circuit layer comprising a first set of one or more electrodes; and
    a third circuit layer spaced apart from the second circuit layer and comprising a second set of one or more electrodes, wherein each electrode in the first set is aligned in at least one direction with a respective electrode in the second set to produce one or more capacitors.

4. The input device of claim 1, wherein:
    the first layer comprises a first circuit layer comprising a first set of one or more electrodes;
    the second layer comprises a second circuit layer comprising a second set of one or more electrodes; and
    each electrode in the first set is aligned in at least one direction with a respective electrode in the second set to produce one or more capacitors.

5. The input device of claim 1, wherein the compliant layer comprises one or more discrete compliant layers.

6. The input device of claim 1, further comprising a trim at least partially surrounding the cover element.

7. The input device of claim 6, wherein the support element is attached to the trim.

8. The input device of claim 6, wherein the support element comprises a bottom surface of the trim.

9. The input device of claim 8, wherein the cover element, the fingerprint sensor, and the force sensor reside within the trim.

10. The input device of claim 1, further comprising a switch element positioned below the support element and configured to detect a user input when the force input exceeds a given amount of force.

11. An input device for use with an electronic device, the input device comprising:
    a cover element;
    one or more first force sensors on a layer having a center opening, the one or more first force sensors positioned adjacent and below the cover element, each first force sensor configured to detect a first force input applied to the cover element; and
    a second force sensor positioned below the cover element and at least partially in the center opening, the second force sensor configured to detect a second force input applied to the cover element; wherein
    at least one of the one or more first force sensors or the second force sensor comprises:
        a first circuit layer comprising a first set of one or more electrodes;
        a second circuit layer spaced apart from the first circuit layer and comprising a second set of one or more electrodes, wherein each electrode in the first set is aligned in at least one direction with a respective electrode in the second set to produce one or more capacitors; and
        a compliant layer positioned between the first circuit layer and the second circuit layer.

12. The input device of claim 11, further comprising a biometric sensor positioned between the cover element and the second force sensor.

13. The input device of claim 11, further comprising a switch element positioned below the second force sensor and configured to detect a user input when the first or the second force input exceeds a given amount of force.

14. The input device of claim 11, wherein the one or more first force sensors and the second force sensor detect both the first force input and the second force input.

15. The input device of claim 11, further comprising a trim at least partially surrounding the cover element.

16. The input device of claim 15, wherein a support element is attached to the trim.

17. The input device of claim 15, wherein the support element comprises a bottom surface of the trim.

18. The input device of claim 17, wherein the cover element, the one or more first force sensor, and the second force sensor reside within the trim.

19. An input device for use with an electronic device, the input device comprising:
- a cover element;
- a compliant layer having a center opening, the compliant layer positioned adjacent and below the cover element;
- a fingerprint sensor positioned below the cover element and at least partially in the center opening, the fingerprint sensor configured to capture a fingerprint of a finger as the finger approaches or contacts the cover element; and
- a force sensor positioned below the fingerprint sensor and over a support element, the force sensor configured to detect a force input applied to the cover element;

wherein the compliant layer comprises one or more discrete compliant layers.

* * * * *